United States Patent
Peng

(10) Patent No.: US 10,271,104 B2
(45) Date of Patent: Apr. 23, 2019

(54) VIDEO PLAY-BASED INFORMATION PROCESSING METHOD AND SYSTEM, CLIENT TERMINAL AND SERVER

(71) Applicant: TENCENT TECHNOLOGY (SHENZHEN) COMPANY LIMITED, Shenzhen (CN)

(72) Inventor: Ao Peng, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 15/635,889

(22) Filed: Jun. 28, 2017

(65) Prior Publication Data
US 2017/0303006 A1    Oct. 19, 2017

Related U.S. Application Data

(63) Continuation of application No. PCT/CN2016/079002, filed on Apr. 11, 2016.

(30) Foreign Application Priority Data

Apr. 28, 2015 (CN) .......................... 2015 1 0209780

(51) Int. Cl.
*G06F 3/00* (2006.01)
*G06F 13/00* (2006.01)
(Continued)

(52) U.S. Cl.
CPC ... *H04N 21/47217* (2013.01); *H04N 21/4316* (2013.01); *H04N 21/4318* (2013.01);
(Continued)

(58) Field of Classification Search
None
See application file for complete search history.

(56) References Cited

U.S. PATENT DOCUMENTS 7,266,781 B1 * 9/2007 Burlowski .......... G06F 11/1448
                                                        704/204
8,310,443 B1    11/2012 Pan
(Continued)

FOREIGN PATENT DOCUMENTS

| CN | 101681194 A | 3/2010 |
| CN | 101772777 A | 7/2010 |

(Continued)

OTHER PUBLICATIONS

International Search Report in international application No. PCT/CN2016/079002, dated Jun. 22, 2016.
(Continued)

*Primary Examiner* — William J Kim
(74) *Attorney, Agent, or Firm* — Syncoda LLC; Feng Ma

(57) ABSTRACT

A video play-based information processing method is realized with a multimedia information processing system, a first client and server for video play, a computer storage medium, and a server used for video play. The method includes: receiving a video content request transmitted by a first client, obtaining a video content requested by the first client, and transmitting the video content to the first client; and during transmission of the video content, transmitting first information associated with the video content and render information of the first information to the first client, for the first client to display the first information associated with the video content via a play interface during playing of the video content. The render information of the first information includes a display start time point, a display duration and display position information of the first information.

17 Claims, 7 Drawing Sheets

(51) Int. Cl.
*H04N 5/445* (2011.01)
*H04N 21/472* (2011.01)
*H04N 21/431* (2011.01)
*H04N 21/61* (2011.01)
*H04N 21/434* (2011.01)

(52) U.S. Cl.
CPC ....... *H04N 21/4348* (2013.01); *H04N 21/472* (2013.01); *H04N 21/6125* (2013.01)

(56) References Cited

U.S. PATENT DOCUMENTS

| | | | |
|---|---|---|---|
| 2003/0149983 A1 | 8/2003 | Markel | |
| 2007/0018952 A1 | 1/2007 | Arseneau | |
| 2007/0180488 A1* | 8/2007 | Walter | H04N 5/783 725/135 |
| 2008/0235733 A1* | 9/2008 | Heie | H04N 7/163 725/46 |
| 2008/0250320 A1* | 10/2008 | Channell | G06F 17/30064 715/716 |
| 2008/0276269 A1 | 11/2008 | Miller | |
| 2008/0276272 A1 | 11/2008 | Rajaraman | |
| 2009/0037947 A1 | 2/2009 | Patil | |
| 2009/0187825 A1* | 7/2009 | Sandquist | G06F 17/241 715/719 |
| 2009/0297118 A1 | 12/2009 | Fink | |
| 2009/0300475 A1 | 12/2009 | Fink | |
| 2009/0327894 A1* | 12/2009 | Rakib | G11B 27/34 715/719 |
| 2011/0040644 A1* | 2/2011 | Juda | G06F 17/241 705/26.3 |
| 2011/0184936 A1* | 7/2011 | Lymberopoulos | G06F 17/30902 707/721 |
| 2012/0320091 A1 | 12/2012 | Rajaraman | |
| 2013/0129311 A1 | 5/2013 | Meads | |
| 2013/0247096 A1 | 9/2013 | Miller et al. | |
| 2013/0298025 A1* | 11/2013 | Lewis | G09B 5/00 715/720 |
| 2013/0339857 A1* | 12/2013 | Garcia Bailo | G06F 3/0484 715/723 |
| 2014/0019862 A1 | 1/2014 | Fink et al. | |
| 2014/0108963 A1* | 4/2014 | Black | G06F 3/04845 715/753 |
| 2014/0115476 A1 | 4/2014 | Fink et al. | |
| 2014/0344661 A1* | 11/2014 | Sipe | G06F 17/30029 715/230 |
| 2015/0350739 A1 | 12/2015 | Miller et al. | |
| 2016/0086257 A1* | 3/2016 | Collins | G06Q 30/0641 705/27.1 |

FOREIGN PATENT DOCUMENTS

| | | |
|---|---|---|
| CN | 102084319 A | 6/2011 |
| CN | 102710976 A | 10/2012 |
| CN | 103561330 A | 2/2014 |
| CN | 104135670 A | 11/2014 |
| CN | 104811814 A | 7/2015 |

OTHER PUBLICATIONS

The Written Opinion of the International Search Authority in international application No. PCT/CN2016/079002, dated Jun. 22, 2016.

Notification of the First Office Action of Chinese application No. 201510209780.5 , dated Jun. 28, 2017.

English translation of the Notification of the First Office Action of Chinese application No. 201510209780.5 , dated Jun. 28, 2017.

* cited by examiner

VIDEO PLAY-BASED INFORMATION PROCESSING METHOD AND SYSTEM, CLIENT TERMINAL AND SERVER

CROSS-REFERENCE TO RELATED APPLICATIONS

This is a continuation application of International Patent Application No. PCT/CN2016/079002, filed on Apr. 11, 2016, which claims priority to Chinese Patent Application No. 201510209780.5 filed on Apr. 28, 2015. The disclosures of these applications are incorporated by reference herein in their entirety.

BACKGROUND

With the development of internet, a great number of online video play tools emerge to provide online video play service for users. The existing online video play is still only limited to propagation of a video content per se, and transmission and play forms of an information content is monotonous. Besides, the existing online video play is lack of interactivity, such that a user will feel bored during watching of an online video.

SUMMARY

The disclosure relates to the technical field of online videos, and in particular to a video play-based information processing method and system, a client, a server, and a computer storage medium.

In order to solve the existing technical problems, the embodiments of the disclosure provide a video play-based information processing method and system, a client, and a server.

An embodiment of the disclosure provides a video play-based information processing method, applied to a server for video play, including:

the server receives a video content request transmitted by a first client, obtains a video content requested by the first client, and transmits the video content to the first client; and the server transmits, during transmission of the video content, first information associated with the video content and render information of the first information to the first client, for the first client to display the first information associated with the video content via a play interface during playing of the video content, herein the render information of the first information includes a display start time point, a display duration and display position information of the first information.

An embodiment of the disclosure further provides a video play-based information processing method, applied to a first client for video play, including:

the first client transmits a video content request to a server, and receives a video content transmitted by the server, first information associated with the video content and render information of the first information, herein the render information of the first information includes a display start time point, a display duration and display position information of the first information; and when it is determined by monitoring a play progress of the video content at the first client that the video content is played to the display start time point of the first information, the first client displays the first information associated with the video content via a play interface according to the render information of the first information.

An embodiment of the disclosure further provides a server, including:

a first receiving unit configured to receive a video content request transmitted by a first client;

a first processing unit configured to search for a video content requested by the first client, first information associated with the video content and render information of the first information; and a first transmission unit configured to transmit the obtained video content to the first client, transmit, during transmission of the video content, the first information associated with the video content and the render information of the first information to the first client, for the first client to display the first information associated with the video content via a play interface during playing of the video content, herein the render information of the first information includes a display start time point, a display duration and display position information of the first information.

An embodiment of the disclosure also provides a first client, including:

a second transmission unit configured to transmit a video content request to a server;

a second receiving unit configured to receive a video content transmitted by the server, first information associated with the video content and render information of the first information, herein the render information of the first information includes a display start time point, a display duration and display position information of the first information; and a second processing unit configured to, when it is determined by monitoring a play progress of the video content at the first client that the video content is played to the display start time point of the first information, display the first information associated with the video content via a play interface according to the render information of the first information.

An embodiment of the disclosure further provides a video play-based information processing system, including the server and the first client according to the embodiments of the disclosure.

An embodiment of the disclosure further provides a computer storage medium having stored therein computer executable instructions configured to execute the abovementioned video play-based information processing methods.

In the video play-based information processing method and system, the client and the server according to the embodiments of the disclosure, by editing first information associated with a video content, it is possible to display the first information at any progress and any position during video play by the client. The embodiments of the disclosure achieve displaying of information other than the video content, it is possible to not only enrich the video play content, expand the form for video play and improve information capacity, but also improve interactivity, such that a user will no longer feel bored during watching of an online video. Moreover, an external linkage of the first information also expands an interactive space of the video content, and the user may search for more pieces of peripheral information by means of the external linkage, which brings more convenience to the user.

DETAILED DESCRIPTION

The technical solutions of the disclosure will be further elaborated below in conjunction with the drawings and specific embodiments. The various embodiments described below can be combined to provide further embodiments.

Embodiment 1

Figure 1:
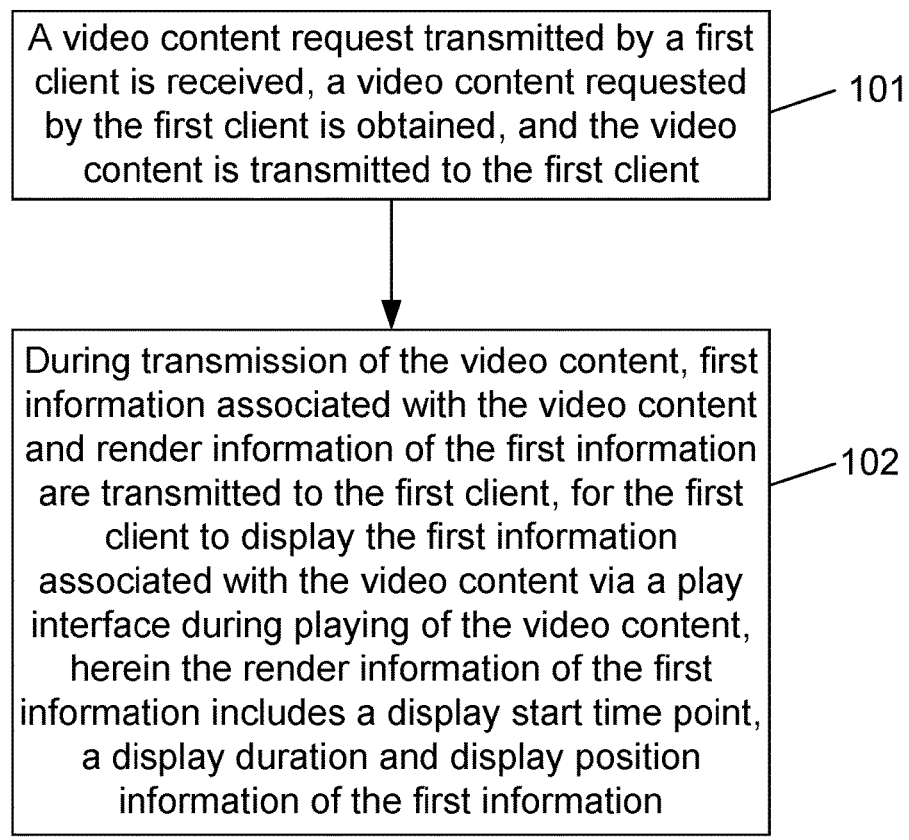
FIG. 1 is a flowchart of a video play-based information processing method according to an embodiment 1 of the disclosure.

As shown in FIG. 1, a video play-based information processing method provided by the embodiment 1 of the disclosure is applied to a server for video play and mainly includes the steps as follows.

Step 101: A video content request transmitted by a first client is received, a video content requested by the first client is obtained, and the video content is transmitted to the first client.

When a user desires to watch and/or download a certain video content, a video content request is transmitted out via a first client thereof, the video content request indicating a video content desired to be requested by the first client (e.g., the video content request carries identification information of a video content desired to be requested). After a server receives the video content request transmitted by the first client, the video content requested by the first client is obtained, and the obtained video content is transmitted to the first client.

Herein, it is to be noted that in the embodiment of the disclosure, an independent content database (or content database cluster) may be adopted for saving and maintenance. The embodiment of the disclosure does not limit a video content obtaining mode of the server. During practical application, any video content obtaining mode of the server applicable to the embodiment of the disclosure shall fall within the protective scope of the embodiment of the disclosure.

In this embodiment and all other embodiments, the client may be an electronic device such as a mobile phone, a tablet computer, a portable computer and the like.

Step 102: During transmission of the video content, first information associated with the video content and render information of the first information are transmitted to the first client, for the first client to display the first information associated with the video content via a play interface during playing of the video content, herein the render information of the first information includes a display start time point, a display duration and display position information of the first information.

As mentioned in Step 101, the video content may be saved and maintained by the independent content database (or content database cluster) in the embodiment of the disclosure. It is to be noted that no matter how to store and maintain the video content, if it is required to display the first information associated with the video content, the first information associated with the video content and the render information of the first information shall be saved and maintained in correspondence to the video content. The first information associated with the video content and the render information of the first information may be saved and maintained in the content database (or content database cluster) together with the video content. Alternatively, the first information associated with the video content, the render information of the first information and the video content may be saved separately. However, it is required to ensure that the video content is associated with the first information and the render information of the first information.

In an implementation, after receiving a video content request of the first client, the server may determine whether the video content request has a first information display function activation indicator. If so, it is shown that the first client activates a first information display function, the first client has a demand for displaying first information during playing of a video content, and in this case, the server may transmit the first information associated with the video content and render information of the first information to the first client. If not, it is shown that the first client does not activate the first information display function, the first client does not have a demand for displaying the first information during playing of the video content, and in this case, the server may not transmit the first information associated with the video content and the render information of the first information to the first client.

Herein, the step of transmitting, during transmission of the video content, the first information associated with the video content and the render information of the first information to the first client includes:

determining, by the server, according to the display start time point of the first information in the render information, a part of the video content to be transmitted to the first client at the display start time point, and transmitting the first information and the render information of the first information at the same time when transmitting the part of the video content to the first client; or when starting to transmit the video content to the first client, transmitting the first information associated with the video content and the render information of the first information to the first client.

It is to be noted that the display start time point of the first information specifies when to start to display the first information at a certain play progress (time point) of the video content. The server may transmit the first information and the render information of the first information to the first client together with the video content at the corresponding time point according to the display start time point of the first information; or, the server may transmit all items of first information associated with the video content and render information of the first information to the first client when starting to transmit the video content. That is, the first information and the render information of the first information are not transmitted to the first client together with the video content at the corresponding time point. Instead, the first information and the render information of the first information are transmitted to the first client immediately when starting to transmit the video content.

It is to be noted that the first information and the render information of the first information may be pre-configured in the server along with the video content; or the first information is provided by a second client, and the server is informed, by the second client, that the first information is transmitted to the first client; and the server allocates the corresponding render information for the first information when obtaining the first information, or, the second client configures the render information corresponding to the first information and transmits same to the server. That is to say, the second client may request the server to display the first information on a video content play interface of the first client, so as to realize interaction between the first client and the second client based on video content play.

In an implementation, the video content request transmitted by the client may further include user feature information of the first client. The method in the embodiment 1 of the disclosure further includes:

after receiving the video content request transmitted by the first client, selecting first information matched with the user feature information from a set of first information associated with the video content according to the user feature information in the request, and transmitting the selected first information and render information of the first information to the first client.

The user feature information may be feature information such as interest points, gender, age and address of a first client user. These items of information may be acquired from cookie by the first client. If the video content request transmitted by the first client carries the user feature information, after receiving the video content request, the server may extract the user feature information therein, select first information matched with the user feature information from a set of first information associated with a to-be-transmitted video content, and transmit the selected first information and render information of the first information to the first client. For example, if the video content request transmitted by the first client carries the gender of a user, the server may select first information matched with gender features from a set of first information associated with the transmitted video content; if the video content request transmitted by the first client carries the age of a user, the server may select first information matched with age features from a set of first information associated with the transmitted video content; and if the video content request transmitted by the first client carries the interest point of a user, the server may select first information matched with interest point features from a set of first information associated with the transmitted video content.

In an implementation, the method in the embodiment 1 of the disclosure further includes:

when transmitting the first information associated with the video content and the render information of the first information to the first client, transmitting an external linkage address of the first information to the first client; or, when obtaining a request for a linkage of the first information from the first client, transmitting the external linkage address of the first information to the first client.

It is to be noted that if the displayed first information has an external linkage address (website address/page address), the server may further transmit the external linkage address of the first information to the first client, in order that a user of the first client directly accesses the external linkage address. The server may transmit the external linkage address to the first client together with the first information associated with the video content and the render information of the first information. Alternatively, the server may transmit the first information associated with the video content and the render information of the first information to the first client firstly. Only when the user of the first client has a demand for accessing the external linkage address of the first information and transmits a request for a linkage of the first information to the server, the external linkage address of the first information is transmitted to the first client.

Embodiment 2

Figure 2:
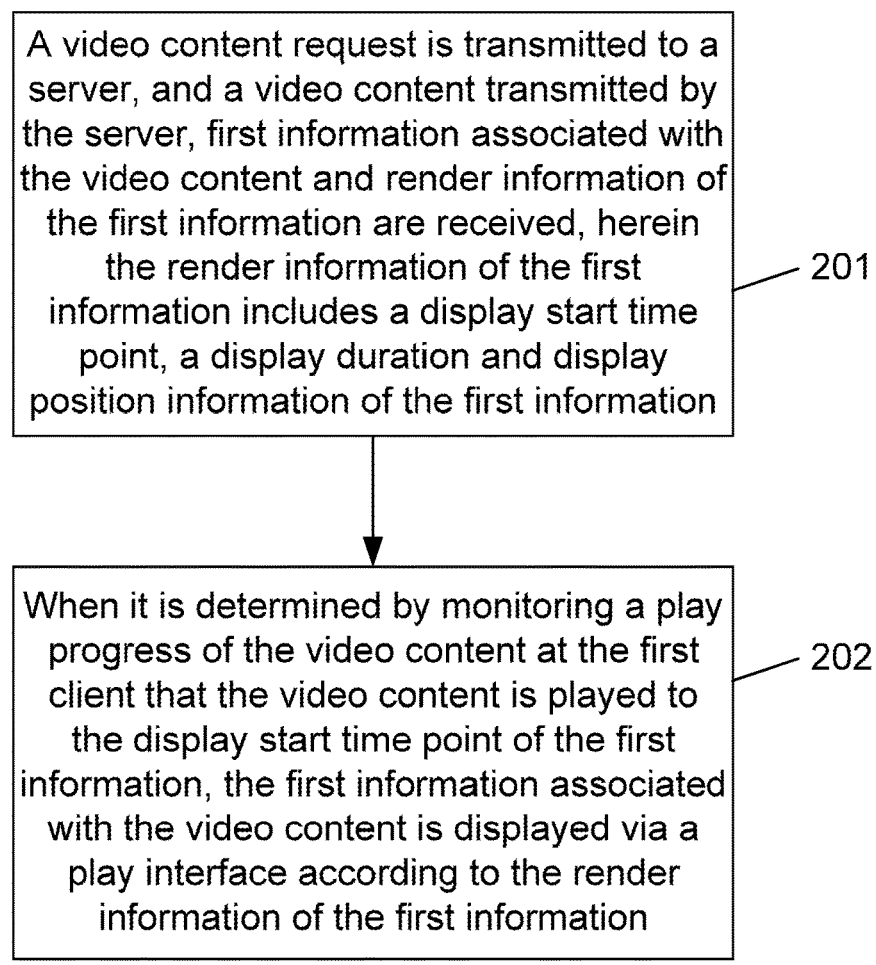
FIG. 2 is a flowchart of a video play-based information processing method according to an embodiment 2 of the disclosure.

As shown in FIG. 2, a video play-based information processing method provided by the embodiment 2 of the disclosure is applied to a first client for video play and mainly includes the steps as follows.

Step 201: A video content request is transmitted to a server, and a video content transmitted by the server, first information associated with the video content and render information of the first information are received, herein the render information of the first information includes a display start time point, a display duration and display position information of the first information.

When a user desires to watch and/or download a certain video content, a video content request is transmitted out via the first client thereof, the video content request indicating a video content desired to be requested by the first client (e.g., the video content request carries identification information of a video content desired to be requested). After the server receives the video content request transmitted by the first client, the video content requested by the first client is obtained, and the obtained video content is transmitted to the first client. Besides, the server also transmits the first information associated with the video content and the render information of the first information to the first client.

In an implementation, the video content request transmitted by the first client may carry an indicator indicating whether a first information display function is activated. If the first client locally activates the first information display function, it is shown that the first client has a demand for displaying first information during playing of a video content, and the video content request transmitted by the first client may carry an indicator indicating that the first information display function has been activated. If the first client does not locally activate the first information display function, it is shown that the first client does not have a demand for displaying the first information during playing of the video content, and the video content request transmitted by the first client may not carry an indicator indicating that the first information display function has been activated, or the video content request indicates that the first information display function is not activated.

Step 202: When it is determined by monitoring a play progress of the video content at the first client that the video content is played to the display start time point of the first information, the first information associated with the video content is displayed via a play interface according to the render information of the first information.

As mentioned in the embodiment 1, the server may determine, according to the display start time point of the first information in the render information, a part of the video content to be transmitted to the first client at the display start time point, and transmit the first information and the render information of the first information to the first client at the same time when transmitting the part of the video content to the first client; or may transmit, when starting to transmit the video content to the first client, the first information associated with the video content and the render information of the first information to the first client. Certainly, no matter how the server transmits the first information associated with the video content and the render information of the first information, the first client only needs to monitor the play progress of the video content at the client according to the display start time point, in the render information, of the received first information. Only when it is determined that the play progress of the video content reaches the display start time point of the first information, the first information associated with the video content is displayed via the play interface according to the render information of the first information.

Herein, the first information and the render information of the first information may be pre-configured in the server along with the video content; or the first information is provided by a second client, and the server is informed, by the second client, that the first information is transmitted to the first client; and the render information for the first information is allocated for the first information when obtaining the first information, or, the render information of the first information is configured by the second client and transmitted to the server. That is to say, the second client may request the server to display the first information on a video content play interface of the first client, so as to realize interaction between the first client and the second client based on video content play.

Specifically, the step of displaying, when it is determined that the video content is played to the display start time point of the first information, the first information associated with the video content via the play interface according to the render information of the first information includes:

extracting first information when it is determined that the video content is played to the display start time point of the first information, rendering the first information at a position area described by the display position information to display the first information for the display duration, and stopping display of the first information when a display duration ends, herein the first information is displayed over the video content in the corresponding position area. That is to say, the first information is displayed on the uppermost layer so as to ensure that the first information is visible to a user. It is to be noted that display of the first information in the embodiment of the disclosure only occupies and covers a position area in the whole video picture without complete coverage over the whole video picture in a paste form. Certainly, preferably, it shall be ensured that the size of a coverage position area of the first information does not affect the user to normally watch the video picture, and it shall be ensured, at least to the greatest extent, that the first information does not cover a key content or key thing in the video picture.

In an implementation, the method in the embodiment 2 of the disclosure further includes:

when the first client displays the first information associated with the video content via the play interface, monitoring a change in position of a mouse, and when it is determined that the position of the mouse falls into a display position of the first information, displaying prompt information of the first information via the play interface.

It is to be noted that the first client displays the first information associated with the video content via the play interface. If the user of the first client moves the mouse into the position area where the first information is displayed in this case, the first client will display the prompt information of the first information via the play interface, herein displaying of the prompt information of the first information may be switching an "arrow" pattern of a mouse pointer into a "hand symbol" pattern, so as to remind the user to be able to click the displayed first information; or, the user may be directly reminded to be able to click the displayed first information by means of text information such as "Click here" and other reminding texts.

In an implementation, the method in the embodiment 2 of the disclosure further includes:

after the prompt information of the first information is displayed via the play interface, monitoring whether the first information is triggered, when it is determined that the first information is triggered, determining whether an external linkage address of the first information is saved locally, and when the external linkage address is saved locally, invoking a local browser of the first client to access the external linkage address; and when the external linkage address is not saved locally, transmitting a request for a linkage of the first information to the server, and invoking the local browser of the first client to access the external linkage address according to the external linkage address of the first information, returned by the server.

Monitoring whether the first information is triggered refers to: monitoring whether the position area where the first information is displayed is clicked by the mouse or triggered by an input device such as a keyboard. When it is determined that the first information is triggered, if the first client has locally saved the external linkage address of the first information, the local browser of the first client may be directly invoked to access the external linkage address; if the first client does not locally save the external linkage address of the first information, the first client may transmit a request for a linkage of the first information to the server, after the external linkage address returned by the server is received, the local browser of the first client is invoked to access the external linkage address, and if the external linkage address returned by the server is not received, an attempt to access the external linkage address may be ended, or the user is promoted of inaccessibility to the external linkage address.

In an implementation, the video content request in the embodiment 2 of the disclosure may further include user feature information of the first client, the user feature information serving as a basis for selection of the first information associated with the video content by the server.

It is to be noted that the user feature information may be feature information such as interest points, gender, age and address of a first client user. These items of information may be acquired from cookie by the first client. The first client provides the user feature information thereof for the server, in order that the server selects first information matched with the user feature information from the first information associated with the video content, thus achieving the aim of accurately positioning and displaying the first information.

In an implementation, the method in the embodiment 2 of the disclosure further includes: when the first client shares the video content, transmitting the video content, the first information associated with the video content and the render information of the first information together to a shared client.

It is to be noted that if the first client locally downloads the video content, the first information associated with the video content and the render information of the first information will be saved locally in the first client together with the video content. If the first client needs to share the video content with other clients, the first client will transmit the video content, the first information associated with the video content and the render information of the first information together to the shared client. So, the associated first information may be displayed on the shared client likewise during play of the video content.

Embodiment 3

Figure 3:
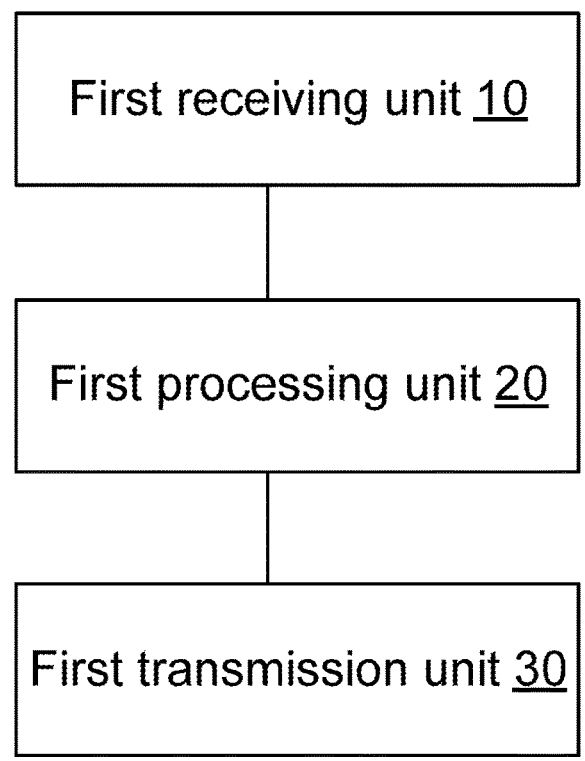
FIG. 3 is a structural diagram of a server for video play according to an embodiment 3 of the disclosure.

In correspondence to a video play-based information processing method in the embodiment 1 of the disclosure, the embodiment 3 of the disclosure provides a server for video play. As shown in FIG. 3, the server mainly includes:

a first receiving unit 10 configured to receive a video content request transmitted by a first client;

a first processing unit 20 configured to search for a video content requested by the first client, first information associated with the video content and render information of the first information; and a first transmission unit 30 configured to transmit the obtained video content to the first client, transmit, during transmission of the video content, the first information associated with the video content and the render information of the first information to the first client, for the first client to display the first information associated with the video content via a play interface during playing of the video content, herein the render information of the first information includes a display start time point, a display duration and display position information of the first information.

In an implementation, after the first receiving unit 10 receives the video content request of the first client, the first processing unit 20 may determine whether the video content request has a first information display function activation indicator. If so, it is shown that the first client activates a first information display function, the first client has a demand for displaying first information during playing of a video content, and in this case, the server may transmit the first information associated with the video content and render information of the first information to the first client. If not, it is shown that the first client does not activate the first information display function, the first client does not have a demand for displaying the first information during playing of the video content, and in this case, the server may not transmit the first information associated with the video content and the render information of the first information to the first client.

Herein, the first information and the render information of the first information are pre-configured in the server along with the video content; or the first information is provided by a second client, and the server is informed, by the second client, that the first information is transmitted to the first client; and the server allocates the corresponding render information for the first information when obtaining the first information, or, the second client configures the render information corresponding to the first information and transmits same to the server.

Herein, the first transmission unit 30 may be further configured to: determine, according to the display start time point of the first information in the render information, a part of the video content to be transmitted to the first client at the display start time point, and transmit the first information and the render information of the first information to the first client at the same time when transmitting the part of the video content to the first client; or when starting to transmit the video content to the first client, transmit the first information associated with the video content and the render information of the first information to the first client.

It is to be noted that the display start time point of the first information specifies when to start to display the first information at a certain play progress (time point) of the video content. The first transmission unit 30 may transmit the first information and the render information of the first information to the first client together with the video content at the corresponding time point according to the display start time point of the first information; or, the first transmission unit 30 may transmit all items of first information associated with the video content and render information of the first information to the first client when starting to transmit the video content. That is, the first information and the render information of the first information are not transmitted to the first client together with the video content at the corresponding time point. Instead, the first information and the render information of the first information are transmitted to the first client immediately when starting to transmit the video content.

In an implementation, the video content request transmitted by the first client may further include user feature information of the first client, and the first processing unit 20 is further configured to: select first information matched with the user feature information from a set of first information associated with the video content according to the user feature information in the video content request.

In an implementation, the first transmission unit 30 is further configured to: when transmitting the first information associated with the video content and the render information of the first information to the first client, transmit an external linkage address of the first information to the first client; or, when the first receiving unit 10 receives a request for a linkage of the first information from the first client, transmit the external linkage address of the first information to the first client.

It is to be noted that if the displayed first information has an external linkage address (website address/page address), the first processing unit 20 may extract the external linkage address, and the first transmission unit 30 may transmit the external linkage address of the first information to the first client, in order that a user of the first client directly accesses the external linkage address. The first transmission unit 30 may transmit the external linkage address to the first client together with the first information associated with the video content and the render information of the first information. Certainly, the first transmission unit 30 may firstly transmit the first information associated with the video content and the render information of the first information to the first client firstly, and when the user of the first client has a demand for accessing the external linkage address of the first information and transmits a request for a linkage of the first information to the server (the request for a linkage of the first information is received by the first receiving unit 10), the first processing unit 20 extracts the external linkage address, and the first transmission unit 30 transmits the external linkage address of the first information to the first client.

In the embodiment 3 of the disclosure, the first receiving unit 10 and the first transmission unit 30 may be implemented by a transceiver chip of the server. The first processing unit 20 may be implemented by a Central Processing Unit (CPU), a Micro Processing Unit (MPU), a Digital Signal Processor (DSP) or a Field-Programmable Gate Array (FPGA) of the server.

Embodiment 4

Figure 4:
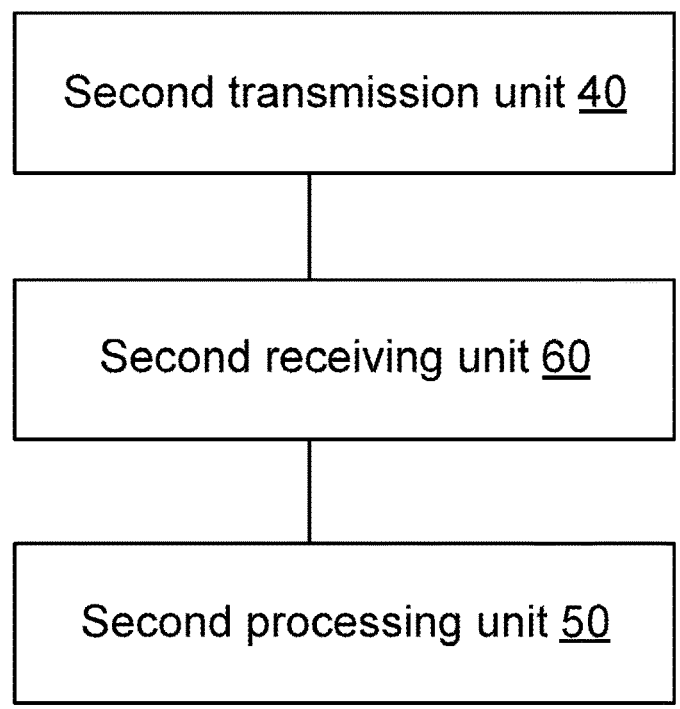
FIG. 4 is a structural diagram of a first client for video play according to an embodiment 4 of the disclosure.

In correspondence to a video play-based information processing method in the embodiment 2 of the disclosure, the embodiment 4 of the disclosure provides a client for video play. As shown in FIG. 4, the client mainly includes:

a second transmission unit 40 configured to transmit a video content request to a server;

a second receiving unit 50 configured to receive a video content transmitted by the server, first information associated with the video content and render information of the first information, herein the render information of the first information includes a display start time point, a display duration and display position information of the first information; and a second processing unit 60 configured to, when it is determined by monitoring a play progress of the video content at the first client that the video content is played to the display start time point of the first information, display the first information associated with the video content via a play interface according to the render information of the first information.

In an implementation, the video content request transmitted by the second transmission unit 40 may carry an indicator indicating whether a first information display function is activated. If the client locally activates the first information display function, it is shown that the client has a demand for displaying first information during playing of a video content, and the video content request transmitted by the second transmission unit 40 may carry an indicator indicating that the first information display function has been activated. If the client does not locally activate the first information display function, it is shown that the client does not have a demand for displaying the first information during playing of the video content, and the video content request transmitted by the second transmission unit 40 may not carry an indicator indicating that the first information display function has been activated, or the video content request indicates that the first information display function is not activated.

Herein, the first information and the render information of the first information are pre-configured in the server along with the video content; or the first information is provided by a second client, and the server is informed, by the second client, that the first information is transmitted to the first client; and the render information for the first information is allocated for the first information when obtaining the first information, or, the render information of the first information is configured by the second client and transmitted to the server.

Herein, the second processing unit 60 is further configured to: extract first information when it is determined that the video content is played to the display start time point of the first information, render the first information at a position area described by display position information to display the first information for the display duration, and stop display of the first information when a display duration ends, the first information being displayed over the video content in the corresponding position area.

In an implementation, the second processing unit 60 is further configured to: when the first information associated with the video content is displayed via the play interface, monitor a change in position of a mouse, and when it is determined that the position of the mouse falls into a display position of the first information, display prompt information of the first information via the play interface.

In an implementation, the second processing unit 60 is further configured to: monitor whether the first information is triggered after the prompt information of the first information is displayed via the play interface, when it is determined that the first information is triggered, determine whether an external linkage address of the first information is saved locally, and when the external linkage address is saved locally, invoke a local browser of the first client to access the external linkage address; and when the external linkage address is not saved locally, inform the second transmission unit 40 to transmit a request for a linkage of the first information to the server, and invoke the local browser of the first client to access the external linkage address according to the external linkage address of the first information, returned by the server and received by the second receiving unit 50.

In an implementation, the video content request may further include user feature information of the first client, the user feature information serving as a basis for selection of the first information associated with the video content by the server.

The second processing unit 60 is further configured to: when the video content is shared, transmit the video content, the first information associated with the video content and the render information of the first information together to a shared client by means of the second transmission unit 40.

In the embodiment 4 of the disclosure, the second transmission unit 40 and the second receiving unit 50 may be implemented by a transceiver chip of the client. The second processing unit 60 may be implemented by a CPU, MPU, DSP or FPGA of the first client.

Embodiment 5

Figure 5:
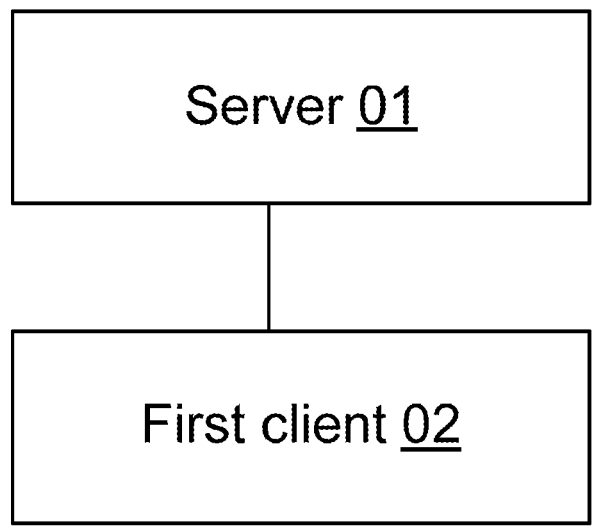
FIG. 5 is a structural diagram of a video play-based information processing system according to an embodiment 5 of the disclosure.

As shown in FIG. 5, a video play-based information processing system provided by the embodiment 5 of the disclosure includes: a server 01 and a first client 02, herein the server 01 is the server in the embodiment 3, and the first client 02 is the first client in the embodiment 4.

The server 01 is configured to: receive a video content request transmitted by the first client 02, obtain a video content requested by the first client 02, and transmit the video content to the first client 02; and transmit, during transmission of the video content, first information associated with the video content and render information of the first information to the first client 02, such that the first client 02 displays the first information associated with the video content via a play interface during playing of the video content, herein the render information of the first information includes a display start time point, a display duration and display position information of the first information.

The first client 02 is configured to: transmit a video content request to the server 01, and receive a video content transmitted by the server 01, first information associated with the video content and render information of the first information, herein the render information of the first information includes a display start time point, a display duration and display position information of the first information; and when it is determined by monitoring a play progress of the video content at the first client 02 that the video content is played to the display start time point of the first information, display the first information associated with the video content via a play interface according to the render information of the first information.

In an implementation, the video content request transmitted by the first client 02 may carry an indicator indicating whether a first information display function of the first client 02 is activated. If the first client 02 locally activates the first information display function, it is shown that the first client 02 has a demand for displaying first information during playing of a video content, and the video content request transmitted by the first client 02 may carry an indicator indicating that the first information display function has been activated. If the first client 02 does not locally activate the first information display function, it is shown that the first client 02 does not have a demand for displaying the first information during playing of the video content, and the video content request transmitted by the first client 02 may not carry an indicator indicating that the first information display function has been activated, or the video content request indicates that the first information display function is not activated.

Correspondingly, after the server 01 receives a video content request of the first client 02, the server 01 may determine whether the video content request has a first information display function activation indicator. If so, it is shown that the first client 02 activates a first information display function, and in this case, the server 01 may transmit the first information associated with the video content and render information of the first information to the first client 02. If not, it is shown that the first client 02 does not activate the first information display function, and in this case, the server 01 may not transmit the first information associated with the video content and the render information of the first information to the first client 02.

In an implementation, the server 01 is further configured to: determine, according to the display start time point of the first information in the render information, a part of the video content to be transmitted to the first client at the display start time point, and transmit the first information and the render information of the first information to the first client 02 at the same time when transmitting the part of the video content to the first client 02; or when starting to transmit the video content to the first client 02, transmit the first information associated with the video content and the render information of the first information to the first client 02.

It is to be noted that the display start time point of the first information specifies when to start to display the first information at a certain play progress (time point) of the video content. The server 01 may transmit the first information and the render information of the first information to the first client 02 together with the video content at the corresponding time point according to the display start time point of the first information. The first information and the render information of the first information may not be transmitted to the first client 02 together with the video content at the corresponding time point. Instead, the first information and the render information of the first information are transmitted to the first client 02 immediately when starting to transmit the video content.

No matter how the server 01 transmits the first information associated with the video content and the render information of the first information, the first client 02 only needs to monitor the play progress of the video content at the first client 02 according to the display start time point, in the render information, of the received first information. Only when it is determined that the play progress of the video content reaches the display start time point of the first information, the first information associated with the video content is displayed via the play interface according to the render information of the first information.

The first client 02 may specifically execute display of the first information in the following modes:

extracting first information when it is determined that the video content is played to the display start time point of the first information, rendering the first information at a position area described by the display position information to display the first information for the display duration, and stopping display of the first information when a display duration ends, herein the first information is displayed over the video content in the corresponding position area. That is to say, the first information is displayed on the uppermost layer so as to ensure that the first information is visible to a user.

In an implementation, the video content request transmitted by the first client 02 may further include user feature information of the first client 02, the user feature information serving as a basis for selection of the first information associated with the video content by the server.

Correspondingly, the server 01 selects first information matched with the user feature information from a set of first information associated with the video content according to the user feature information in the video content request.

In an implementation, when displaying the first information associated with the video content via the play interface, the first client 02 may further monitor a change in position of a mouse, and when it is determined that the position of the mouse falls into a display position of the first information, the first client displays prompt information of the first information via the play interface.

It is to be noted that the first client 02 displays the first information associated with the video content via the play interface. If the user of the first client 02 moves the mouse into the position area where the first information is displayed in this case, the first client will display the prompt information of the first information via the play interface, herein displaying of the prompt information of the first information may be switching an "arrow" pattern of a mouse pointer into a "hand symbol" pattern, so as to remind the user to be able to click the displayed first information; or, the user may be directly reminded to be able to click the displayed first information by means of text information such as "Click here" and other reminding texts.

In an implementation, after the prompt information of the first information is displayed via the play interface, the first client 02 is configured to: monitor whether the first information is triggered, when it is determined that the first information is triggered, determine whether an external linkage address of the first information is saved locally, and when the external linkage address is saved locally, invoke a local browser of the first client 02 to access the external linkage address; and when the external linkage address is not saved locally, transmit a request for a linkage of the first information to the server 01, and invoke the local browser of the first client 02 to access the external linkage address according to the external linkage address of the first information, returned by the server 01.

The server 01 may transmit the external linkage address of the first information to the first client 02 when transmitting the first information associated with the video content and the render information of the first information to the first client 02; or, the server 01 may transmit the external linkage address of the first information to the first client 02 when receiving a request for a linkage of the first information from the first client 02.

In an implementation, when sharing the video content, the first client 02 may transmit the video content, the first information associated with the video content and the render information of the first information together to a shared client.

It is to be noted that the first information in the embodiments of the disclosure may be in multiple forms such as pictures, expression animations and Flash animations. Moreover, the first information may be divided into a content type and an advertisement type. The content type refers to that the first information is configured to display other content associated with the video content. The advertisement type refers to that the first information is configured to display an advertisement. However, regardless of the forms of the first information, compared with the conventional art, the embodiments of the disclosure achieve displaying of information other than the video content, and expand the play form and space of information. The information processing method in the embodiments of the disclosure will be further elaborated in detail below in conjunction with specific application scenarios.

Embodiment 6

The embodiment 6 of the disclosure describes the following application scenario: a server edits first information associated with a video content, the first information mainly including situational expressions, animation asides and the like, and these situational expressions and animation asides being associated with the video content; a first client activates a first information display function, and requests the server for the video content, and the server transmits the video content, the first information and render information thereof to the first client; and the first client completes display of the first information during play of the video content. The application scenario in the embodiment 6 of the disclosure achieves completion of picture bullet screen when the first client plays the video content, and bullet screen contents may be preset contents of the server, or may be contents transmitted to the server by a second client.

Information processing under the above application scenario mainly includes the steps as follows.

A user transmits a video content request to a server by means of a first client corresponding to the user, the request carrying an indicator indicating that a first information display function of the first client has been activated.

After receiving the video content request of the first client, the server knows, according to indication information therein, that the first client has activated the first information display function, thereby extracting a video content requested by the first client, first information associated with the video content and render information of the first information from a content database; the server transmits the extracted video content to the first client, and during transmission of the video content, the server determines, according to the display start time point of the first information in the render information, a part of the video content to be transmitted to the first client at the display start time point, and transmits the first information and the render information of the first information to the first client at the same time when transmitting the part of the video content to the first client; and for example, a display start time point of certain first information is a 6'46" position of the video content, so the server transmits first information at 6'46" and render information thereof together to the first client while transmitting a video content data frame at 6'46" to the first client.

Figure 6:
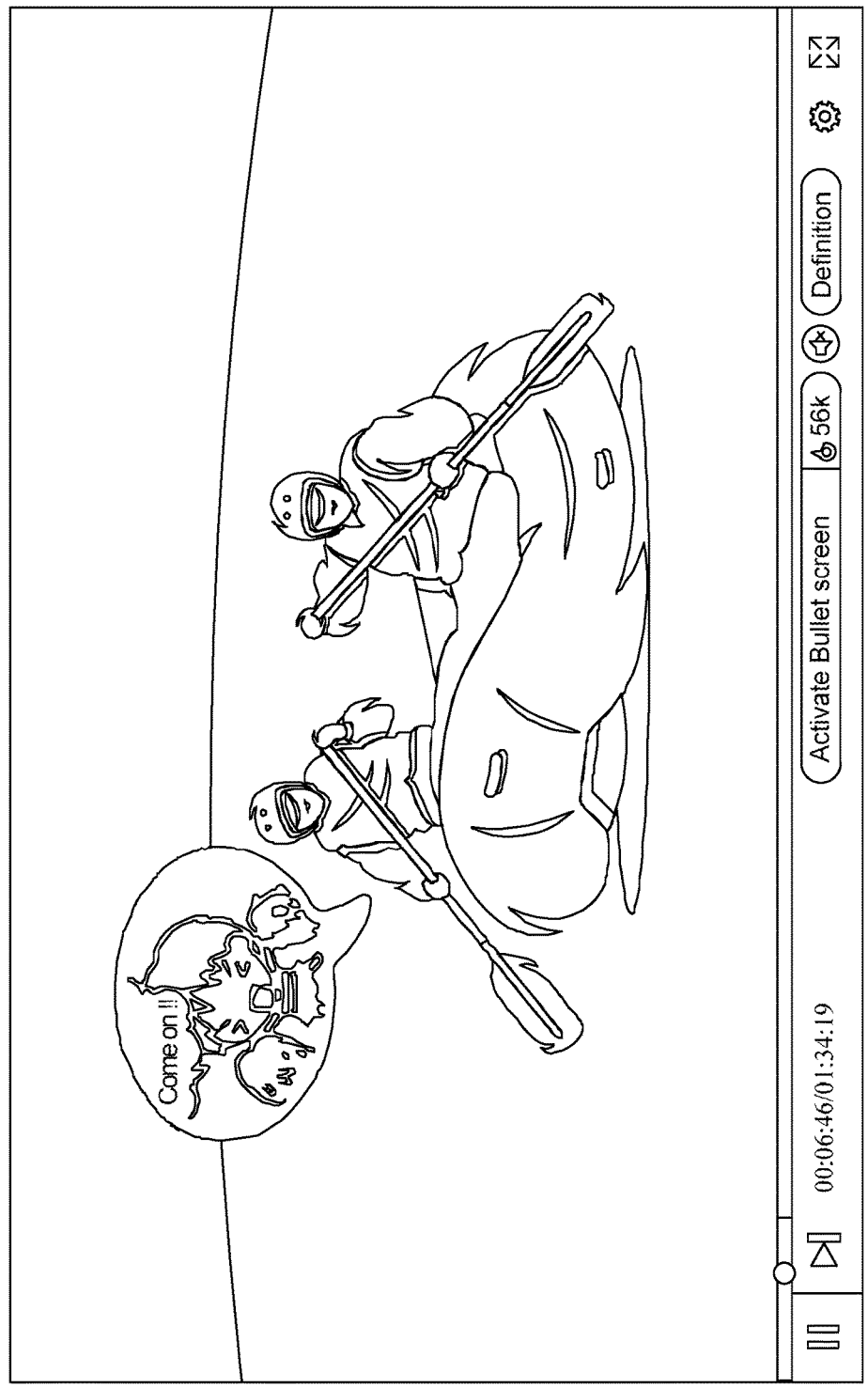
FIG. 6 is a schematic diagram of a video content play and first information display interface according to an embodiment 6 of the disclosure.

The first client may receive and play the video content at the same time. Moreover, during play of the video content, the first client monitors the play progress of the video content. When it is determined that the play progress of the video content reaches the display start time point of the first information, the first information associated with the video content is displayed via a play interface according to the render information of the first information. For example, during play of the video content, the first client monitors the play progress of the video content, when it is determined that the play progress of the video content reaches 6'46", first information corresponding to 6'46" is extracted, and covers a position area described by display position information to display a corresponding duration, and display of the first information is stopped when a display duration ends; FIG. 6 shows a schematic diagram of a display interface of first information, first information displayed in a video content play interface shown in FIG. 6 is a situational expression "Come on", and the situational expression is closely related to a video picture at 6'46"; and moreover, during display of the situational expression, the video content is continuously played without stopping.

By displaying situational expressions, animation asides and the like associated with the video content during video play, a video play content is enriched, and the form is expanded; and moreover, the interactivity is improved, such that a user will not feel bored any longer during watching of an online video.

Embodiment 7

The embodiment 7 of the disclosure describes the following application scenario: a server edits first information associated with a video content, the first information being an advertisement; a first client activates a first information display function, and requests the server for the video content, and the server transmits the video content, the first information and render information thereof to the first client; and the first client completes display of the first information during play of the video content. The application scenario in the embodiment 7 of the disclosure achieves completion of picture bullet screen when the first client plays the video content, and bullet screen contents may be preset advertisements of the server.

Information processing under the above application scenario mainly includes the steps as follows.

A user transmits a video content request to a server by means of a first client corresponding to the user, the request carrying an indicator indicating that a first information display function of the first client has been activated.

After receiving the video content request of the first client, the server knows, according to indication information therein, that the first client has activated the first information display function, thereby extracting a video content requested by the first client, first information associated with the video content and render information of the first information from a content database; and if the video content request carries user feature information of the first client, the server may select first information matched with the user feature information from a set of first information associated with the video content according to the user feature information in the request. For example, if the video content request carries interest point information of the user of the first client, the server may select an advertisement matched with the interest point and transmit it to the first client; and if the video content request carries gender information of the user of the first client, the server may select an advertisement matched with the gender and transmit it to the first client.

The server transmits the extracted video content to the first client, and during transmission of the video content, the server determines, according to the display start time point of the first information in the render information, a part of the video content to be transmitted to the first client at the display start time point, and transmits the first information and the render information of the first information to the first client at the same time when transmitting the part of the video content to the first client; and for example, a display start time point of certain first information is a 48" position of the video content, so the server transmits first information at 48" and render information thereof together to the first client while transmitting a video content data frame at 48" to the first client.

Figure 7:
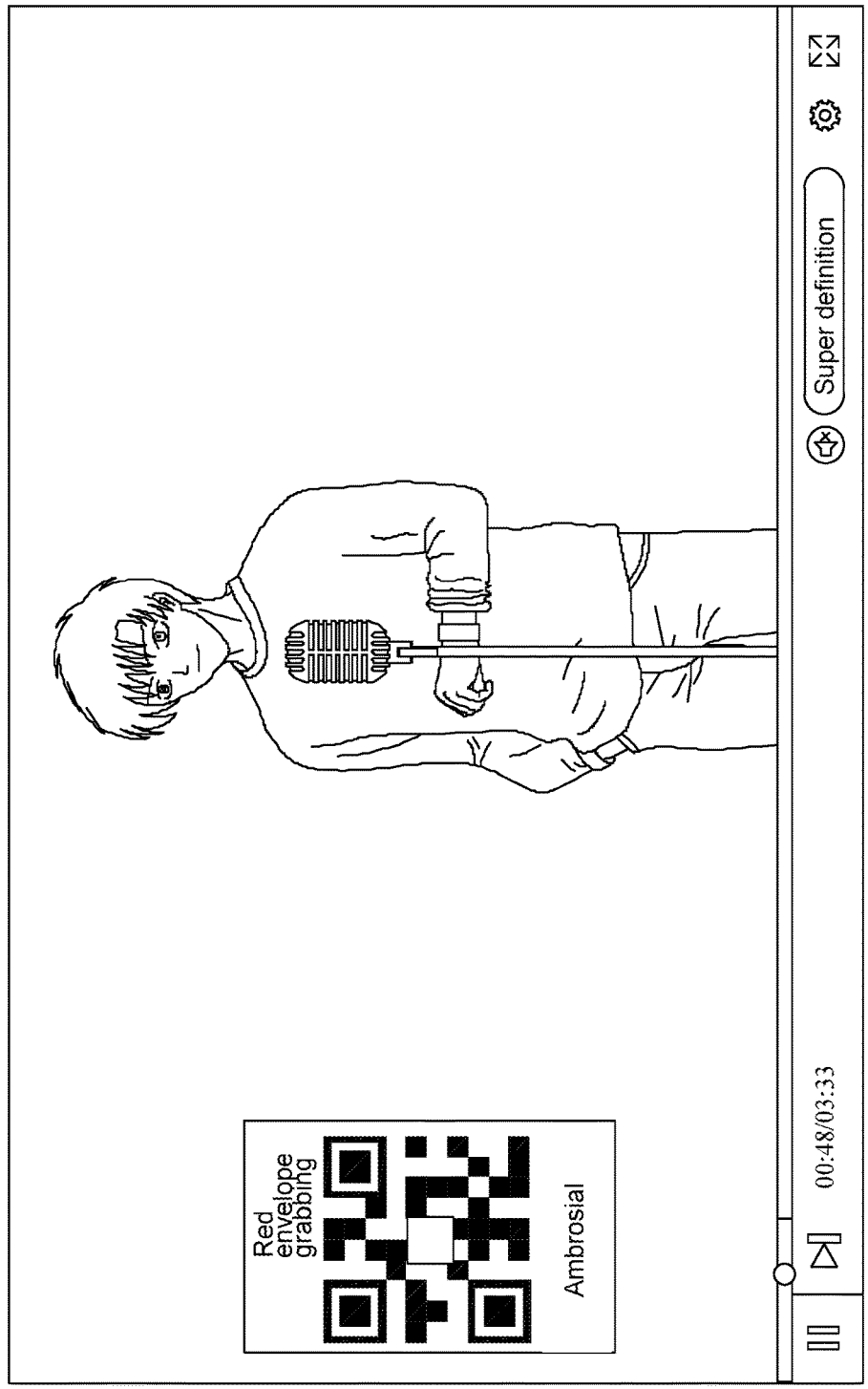
FIG. 7 is a schematic diagram of a video content play and first information display interface according to an embodiment 7 of the disclosure.

The first client may receive and play the video content at the same time. Moreover, during play of the video content, the first client monitors the play progress of the video content. When it is determined that the play progress of the video content reaches the display start time point of the first information, the first information associated with the video content is displayed via a play interface according to the render information of the first information. For example, during play of the video content, the first client monitors the play progress of the video content, when it is determined that the play progress of the video content reaches 48", first information corresponding to 48" is extracted, and covers a position area described by display position information to display a corresponding duration, and display of the first information is stopped when a display duration ends; FIG. 7 shows a schematic diagram of a display interface of first information, first information displayed in a video content play interface shown in FIG. 7 is a QR code interaction picture at the left lower corner of a video picture; and during display of the QR code interaction picture, the video content is continuously played without stopping.

When displaying the first information associated with the video content via the play interface, the first client monitors a change in position of a mouse, and when it is determined that the position of the mouse falls into a display position of the first information, displays prompt information of the first information via the play interface. For example, in FIG. 7, if the user moves the mouse into a display area of the QR code interaction picture during display of the QR code interaction picture, the first client will switch an "arrow" pattern of a mouse pointer into a "hand symbol" pattern, so as to remind the user to be able to click the displayed first information.

When the user clicks the QR code interaction picture by using the mouse, the first client monitors that the QR code interaction picture is triggered, so as to determine whether the first client locally saves an external linkage address of the QR code interaction picture, and when the external linkage address is saved locally, a local browser of the first client is invoked to access the external linkage address; and when the external linkage address is not saved locally, the first client transmits a request for a linkage of the first information to the server, and invokes the local browser of the first client to access the external linkage address according to the external linkage address of the QR code interaction picture, returned by the server.

It is to be noted that if it is required to share the video content with other clients, the first client may transmit the video content, the first information associated with the video content and the render information of the first information together to a shared client during sharing of the video content.

In conclusion, by editing first information associated with a video content, it is possible to display the first information at any progress and any position during video play by the client. The embodiments of the disclosure achieve displaying of information other than the video content, it is possible to not only enrich the video play content, expand the form for video play and improve information capacity, but also improve interactivity, such that a user will no longer feel bored during watching of an online video. Moreover, an external linkage of the first information also expands an interactive space of the video content, and the user may search for more pieces of peripheral information by means of the external linkage, which brings more convenience to the user.

Besides, the embodiments of the disclosure may be combined with the technical solution for text bullet screen in the conventional art without collisions.

If the integrated module in the embodiments of the disclosure is implemented in a form of a software function module and is sold or used as an independent product, the product may be stored in a computer readable storage medium. Based on this understanding, those skilled in the art shall understand that the embodiments of the application may be provided as a method, a system or a computer program product. Thus, forms of complete hardware embodiments, complete software embodiments or embodiments integrating software and hardware may be adopted in the application. Moreover, a form of the computer program product implemented on one or more computer available storage media containing computer available program codes may be adopted in the application. The storage media include, but are not limited to, a U disk, a mobile hard disk, a Read-Only Memory (ROM), a disk memory, a Compact Disc (CD)-ROM, an optical memory and the like.

The application is described with reference to flow charts and/or block diagrams of the method, the device (system) and the computer program product according to the embodiments of the disclosure. It will be appreciated that each flow and/or block in the flow charts and/or the block diagrams and a combination of the flows and/or the blocks in the flow charts and/or the block diagrams may be implemented by computer program instructions. These computer program instructions may be provided for a general computer, a dedicated computer, an embedded processor or processors of other programmable data processing devices to generate a machine, such that an apparatus for implementing functions designated in one or more flows of the flow charts and/or one or more blocks of the block diagrams is generated via instructions executed by the computers or the processors of the other programmable data processing devices.

These computer program instructions may be stored in a computer readable memory capable of guiding the computers or the other programmable data processing devices to work in a specific mode, such that a manufactured product including an instruction apparatus is generated via the instructions stored in the computer readable memory, and the instruction apparatus implements the functions designated in one or more flows of the flow charts and/or one or more blocks of the block diagrams.

These computer program instructions may be loaded to the computers or the other programmable data processing devices, such that processing implemented by the computers is generated by executing a series of operation steps on the computers or the other programmable devices, and therefore the instructions executed on the computers or the other programmable devices provide a step of implementing the functions designated in one or more flows of the flow charts and/or one or more blocks of the block diagrams.

Although the preferred embodiments of the application have been described, once those skilled in the art obtains a basic creativity concept, those skilled in the art may change and modify these embodiments additionally. Thus, the appended claims are intended to be interpreted as all changes and modifications including the preferred embodiments and falling within the scope of the application.

Correspondingly, an embodiment of the disclosure also provides a computer storage medium in which a computer executable instruction is stored. The computer executable instruction is configured to execute the information processing method according to the embodiment of the disclosure.

The embodiments of the disclosure provide a video play-based information processing solution. By editing first information associated with a video content, it is possible to display the first information at any progress and any position during video play by the client. The embodiments of the disclosure achieve displaying of information other than the video content, it is possible to not only enrich the video play content, expand the form for video play and improve information capacity, but also improve interactivity, such that a user will no longer feel bored during watching of an online video. Moreover, an external linkage of the first information also expands an interactive space of the video content, and the user may search for more pieces of peripheral information by means of the external linkage, which brings more convenience to the user.

What is claimed is:

1. A video play-based information processing method, comprising:
   receiving, by a server, a video content request transmitted by a first client, obtaining a video content requested by the first client, and transmitting the video content to the first client, wherein the video content request comprises identification information of the video content requested by the first client and an interest point of a user of the first client;
   selecting, by the server according to the interest point comprised in the request, first information matched with the interest point from a set of first information associated with the video content;
   transmitting, by the server during transmission of the video content, the selected first information associated with the video content and render information of the first information to the first client, for the first client to display the selected first information associated with the video content via a play interface during playing of the video content,
   wherein the render information of the first information comprises a display start time point, a display duration and display position information of the first information, wherein for users having different interest points, different first information is selected by the server and transmitted to the first client;
   wherein the video content request further comprises a first information display function activation indicator depending on whether a first information display function is activated at the first client, and
   wherein the method further comprises:
   determining whether the video content request comprises the indicator,
   in response to determining that the video content request comprises the indicator when the first information display function is activated at the first client, transmitting, by the server during transmission of the video content, the selected first information associated with the video content and render information of the first information to the first client;
   in response to determining that the video content request does not comprise the indicator when the first information display function is not activated at the first client, not transmitting, by the server during transmission of the video content, the selected first information associated with the video content and render information of the first information to the first client.

2. The video play-based information processing method according to claim 1, wherein transmitting, by the server during transmission of the video content, the selected first information associated with the video content and the render information of the first information to the first client comprises:
   determining, by the server, according to the display start time point of the first information in the render information, a part of the video content to be transmitted to the first client at the display start time point, and transmitting the first information and the render information of the first information to the first client at the same time when transmitting the part of the video content to the first client; or,
   when starting to transmit the video content to the first client, transmitting, by the server, the first information associated with the video content and the render information of the first information to the first client.

3. The video play-based information processing method according to claim 2, further comprising:
   pre-configuring, by the server, the first information and the render information of the first information in the server along with the video content; or
   when the server is informed by a second client that the first information provided by the second client is transmitted to the first client, allocating, by the server, the corresponding render information to the first information when the server obtains the first information, or, receiving, by the server, the render information of the first information that is configured by the second client.

4. The video play-based information processing method according to claim 1, further comprising:
   when transmitting the selected first information associated with the video content and the render information of the first information to the first client, transmitting, by the server, an external linkage address of the first information to the first client; or,
   when obtaining a request for a linkage of the first information from the first client, transmitting, by the server, the external linkage address of the first information to the first client.

5. A video play-based information processing method, comprising:
   transmitting, by a first client to a server, a video content request comprising identification information of a video content requested by the first client and an interest point of a user of the first client, and receiving, from the server, the video content requested by the first client, first information associated with the video content and matched with the interest and render information of the first information, wherein the interest point of the user of the first client serves as a basis for the server to select the first information associated with the video content and matched with the interest point, from a set of first information associated with the video content, and the render information of the first information comprises a display start time point, a display duration and display position information of the first information; and
   when it is determined by monitoring a play progress of the video content at the first client that the video content is played to the display start time point of the first information, displaying, by the first client, the first information associated with the video content via a play interface according to the render information of the first information,
   wherein for different users having different interest points, different first information is received by the first client from the server;
   wherein the video content request further comprises a first information display function activation indicator depending on whether a first information display function is activated at the first client, and
   wherein the method further comprises:
   when the first information display function is activated at the first client, receiving, by the first client from the server, the first information associated with the video content and matched with the interest and the render information of the first information;
   when the first information display function is not activated at the first client, not receiving, by the first client from the server, the first information associated with the video content and matched with the interest and the render information of the first information.

6. The video play-based information processing method according to claim 5, wherein
the first information and the render information of the first information are pre-configured in the server along with the video content; or
the first information is provided by a second client, and the server is informed, by the second client, that the first information is transmitted to the first client; and the render information of the first information is allocated to the first information when the server obtains the first information, or, the render information of the first information is configured by the second client and transmitted to the server.

7. The video play-based information processing method according to claim 5, wherein displaying, when it is determined that the video content is played to the display start time point of the first information, the first information associated with the video content via the play interface according to the render information of the first information comprises:
extracting, by the first client, the first information when it is determined that the video content is played to the display start time point of the first information, rendering the first information at a position area described by the display position information to display the first information for the display duration, and stopping display of the first information when a display duration ends,
the first information being displayed over the video content in the position area.

8. The video play-based information processing method according to claim 5, further comprising:
when displaying the first information associated with the video content via the play interface, monitoring, by the first client, a change in position of a mouse, and when it is determined that the position of the mouse falls into a display position of the first information, displaying prompt information of the first information via the play interface.

9. The video play-based information processing method according to claim 8, further comprising:
after the prompt information of the first information is displayed via the play interface, monitoring, by the first client, whether the first information is triggered, when it is determined that the first information is triggered, determining whether an external linkage address of the first information is saved locally, and when the external linkage address is saved locally, invoking a local browser of the first client to access the external linkage address; and when the external linkage address is not saved locally, transmitting a request for a linkage of the first information to the server, and invoking the local browser of the first client to access the external linkage address according to the external linkage address of the first information, returned by the server.

10. The video play-based information processing method according to claim 5, further comprising:
when the first client shares the video content, transmitting, by the first client, the video content, the first information associated with the video content and the render information of the first information together to a shared client.

11. A server, comprising:
a memory storing processor-executable instructions; and
a processor arranged to execute the stored processor-executable instructions to perform steps of:
receiving a video content request transmitted by a first client, obtaining a video content requested by the first client, and transmitting the video content to the first client: wherein the video content request comprises identification information of the video content requested by the first client and an interest point of a user of the first client;
selecting, according to the interest point comprised in the request, first information matched with the interest point from a set of first information associated with the video content;
transmitting, during transmission of the video content, the selected first information associated with the video content and render information of the first information to the first client, for the first client to display the selected first information associated with the video content via a play interface during playing of the video content, wherein the render information of the first information comprises a display start time point, a display duration and display position information of the first information,
wherein for users having different interest points, different first information is selected by the server and transmitted to the first client;
wherein the video content request further comprises a first information display function activation indicator depending on whether a first information display function is activated at the first client, and
wherein the processor is arranged to execute the stored processor-executable instructions to further perform a step of:
determining whether the video content request comprises the indicator,
in response to determining that the video content request comprises the indicator when the first information display function is activated at the first client, transmitting, by the server during transmission of the video content, the selected first information associated with the video content and render information of the first information to the first client;
in response to determining that the video content request does not comprise the indicator when the first information display function is not activated at the first client, not transmitting, by the server during transmission of the video content, the selected first information associated with the video content and render information of the first information to the first client.

12. The server according to claim 11, wherein transmitting, during transmission of the video content, the selected first information associated with the video content and the render information of the first information to the first client comprises:
determining, according to the display start time point of the first information in the render information, a part of the video content to be transmitted to the first client at the display start time point, and transmitting the first information and the render information of the first information at the same time when transmitting the part of the video content to the first client; or
when starting to transmit the video content to the first client, transmitting the first information associated with the video content and the render information of the first information to the first client.

13. The server according to claim 12, wherein the processor is arranged to execute the stored processor-executable instructions to further perform a step of:
pre-configuring the first information and the render information of the first information in the server along with the video content; or,
when the server is informed by a second client that the first information provided by the second client is transmitted to the first client, allocating the corresponding render information to the first information when the server obtains the first information, or, receiving the render information of the first information that is configured by the second client.

14. A first client, comprising:
a memory storing processor-executable instructions; and
a processor arranged to execute the stored processor-executable instructions to perform steps of:
transmitting, by a first client to a server, a video content request comprising identification information of a video content requested by the first client and an interest point of a user of the first client, and receiving, from the server, the video content requested by the first client, first information associated with the video content and matched with the interest and render information of the first information, wherein the interest point of the user of the first client serves as a basis for the server to select the first information associated with the video content and matched with the interest point, from a set of first information associated with the video content, and the render information of the first information comprises a display start time point, a display duration and display position information of the first information; and
when it is determined by monitoring a play progress of the video content at the first client that the video content is played to the display start time point of the first information, displaying the first information associated with the video content via a play interface according to the render information of the first information,
wherein for different users having different interest points, different first information is received by the first client from the server;
wherein the video content request further comprises a first information display function activation indicator depending on whether a first information display function is activated at the first client, and
wherein the processor is arranged to execute the stored processor-executable instructions to further perform steps of:

when the first information display function is activated at the first client, receiving, by the first client from the server, the first information associated with the video content and matched with the interest and the render information of the first information;
when the first information display function is not activated at the first client, not receiving, by the first client from the server, the first information associated with the video content and matched with the interest and the render information of the first information.

15. The first client according to claim 14, wherein
the first information and the render information of the first information are pre-configured in the server along with the video content; or
the first information is provided by a second client, and the server is informed, by the second client, that the first information is transmitted to the first client; and the render information of the first information is allocated to the first information when the server obtains the first information, or, the render information of the first information is configured by the second client and transmitted to the server.

16. The first client according to claim 14, wherein displaying, when it is determined that the video content is played to the display start time point of the first information, the first information associated with the video content via the play interface according to the render information of the first information comprises:
extracting first information when it is determined that the video content is played to the display start time point of the first information, rendering the first information at a position area described by the display position information to display the first information for the display duration, and stopping display of the first information when a display duration ends,
the first information being displayed over the video content in the position area.

17. The first client according to claim 14, wherein the processor is arranged to execute the stored processor-executable instructions to further perform a step of:
when the first information associated with the video content is displayed via the play interface, monitoring a change in position of a mouse, and when it is determined that the position of the mouse falls into a display position of the first information, displaying prompt information of the first information via the play interface.

* * * * *